J. V. NEWTON.
SPOOL HOLDER.
APPLICATION FILED SEPT. 17, 1909.
961,637.
Patented June 14, 1910.
2 SHEETS—SHEET 1.
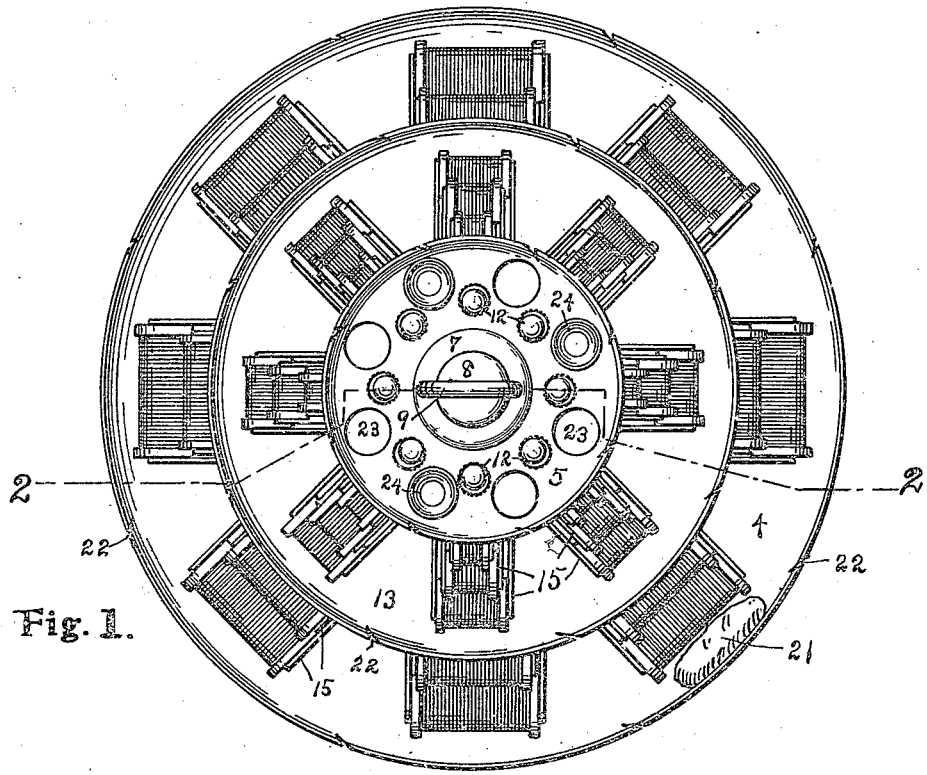
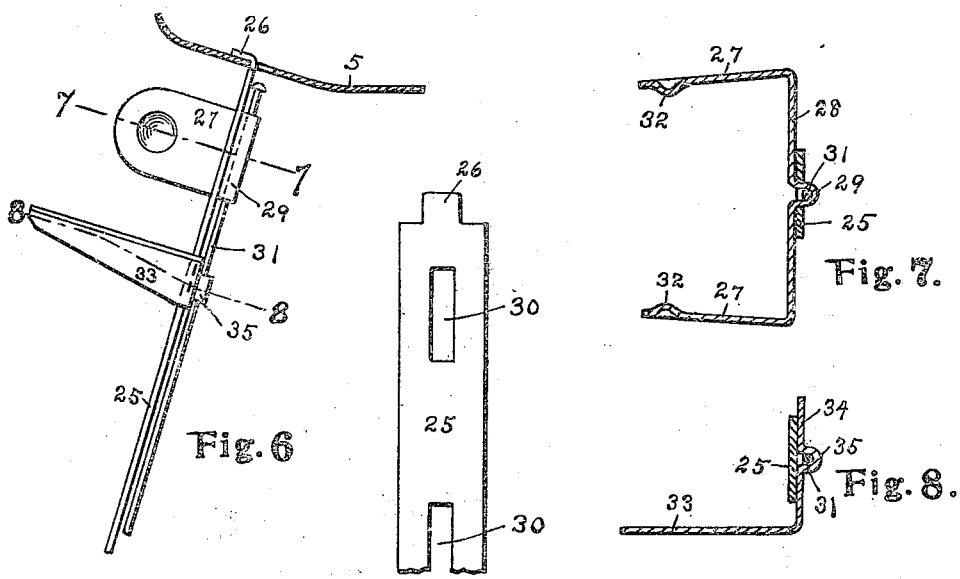
Witnesses
O. B. Baenziger.
E. M. Brown.
Inventor
John V. Newton.
By Edward N. Pagelsen
Attorney

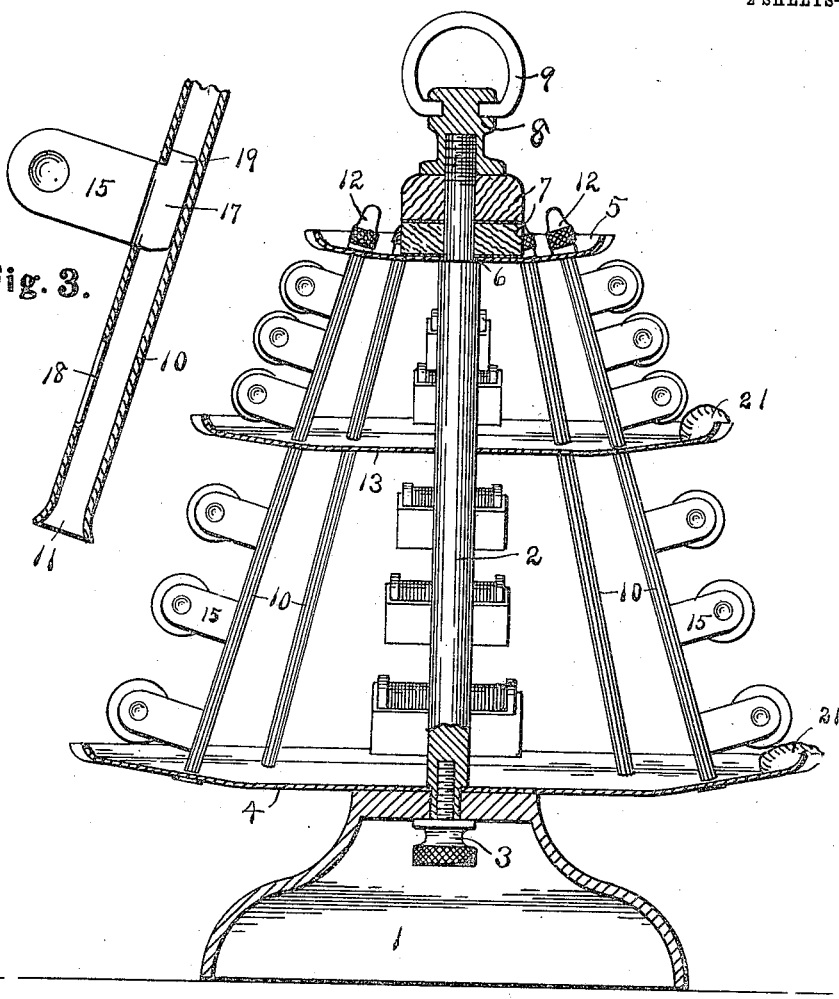
Fig. 3.
Fig. 2.
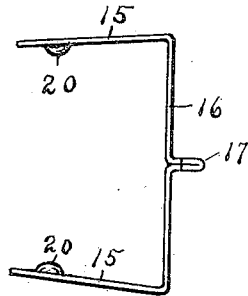
Fig. 4.
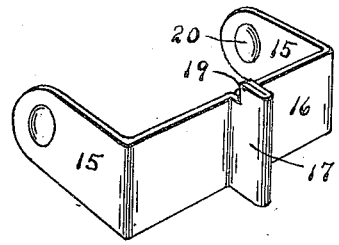
Fig. 5.

UNITED STATES PATENT OFFICE.

JOHN V. NEWTON, OF LOS ANGELES, CALIFORNIA.

SPOOL-HOLDER.

961,637.

Specification of Letters Patent. Patented June 14, 1910.

Application filed September 17, 1909. Serial No. 518,148.

*To all whom it may concern:*

Be it known that I, JOHN V. NEWTON, a citizen of the United States, and a resident of Los Angeles, in the county of Los Angeles and State of California, have invented a new and Improved Spool-Holder, of which the following is a specification.

This invention relates to means for properly holding a large number of spools of threads, and its object is to provide a holder upon which the spools can be easily and quickly mounted and when empty removed, where the spools are all easily accessible, and which shall have a pleasing appearance.

In the accompanying drawings, Figure 1 is a plan of the holder with spools of threads in position. Fig. 2 is a vertical cross section on the line 2—2 of Fig. 1, spool-clamps and spools being omitted from two standards for clearness. Fig. 3 is a section of the lower end of a standard. Figs. 4 and 5 are views of spool-clamps. Fig. 6 is a side view of the upper end of a modified form of standard having a thread-cutter mounted on the same. Fig. 7 is a cross section on the line 7—7 of Fig. 6. Fig. 8 is a cross section on the line 8—8 of Fig. 6. Fig. 9 is a front view of the upper end of the standard shown in Fig. 6.

Similar reference characters refer to like parts throughout the several views.

The base 1 may be of any desired form and has a central hole in which is revolubly mounted the lower end of the upright rod 2. A thumb screw 3 holds the rod in position. The lower plate 4 rests on the base while the upper plate 5 rests on a small shoulder 6 formed on the upright. Above the upper plate may be placed a pin cushion in the form of a washer or sleeve, preferably of two pieces 7 of cork, which are held in place by the nut 8. The holder can be easily carried about or suspended by the ring 9.

The standards 10 are preferably in the form of tubes, having their lower ends 11 expanded to prevent slipping up through the holes in the plate 4, and having their upper ends threaded to receive the nuts 12. An intermediate plate 13 may be loosely mounted on the upright and because of their shape will rest on the sides of the standards. The standards are inserted from below and are firmly secured in position by the nuts 12. When the standards are secured in position, they, together with the plates and upright, form a rigid frame which is revoluble on the base. As the upper disk 6 is preferably of less diameter than the lower disk 4, and as the circle of holes for the standards 10 in the upper disk is also of less diameter than that of the lower disk, the standards will have an inclined position as shown in Fig. 2.

The spool-clamps are of resilient sheet-metal, preferably of spring-bronze in the form shown in Figs. 4 and 5, having sides 15, backs 16, and projecting tongues 17 which are adapted to enter the slots 18 in the standards. These tongues have upward extensions 19 which hook back of the walls of the standards above the slots, as shown in Fig. 3, and thus hold the clamps in position. The sides 15 have inwardly extending projections 20 which serve as trunnions for the spools. The resilience of the sheet-metal causes the ends of the spools to be slightly clamped, preventing the spools from turning and the thread from unwinding when not desired.

Pieces of wax 21 may be placed on the plates in such positions that the threads may be pulled across the same, and the plates may be formed with sharp-edged notches 22 into which the threads may be drawn to cut them off. Holes 23 may be formed where desired to receive the thimbles 24. Instead of round tubular standards 10, flat bars 25 shown in Figs. 6 to 9 may be employed. The bars are formed with tongues 26 which extend through the upper plate 5 and are bent down, thus holding the bars in position. The clamps have sides 27 and backs 28, the backs having ridges 29 adapted to extend through slots 30 in the bars, locking pins 31 being used to hold the clamps in position. The sides 27 have trunnions 32 as before explained.

Figs. 6 and 8 show a thread cutter consisting of a blade 33 and a back 34 which has a struck-up eyelet 35 to receive the locking pin 31. The back is shown between the bar 25 and locking pin 31, held in place by friction, thus not requiring a slot 30. This cutter could be mounted in place of any of the spool clamps shown in Figs. 4 and 5, or between any two of the clamps.

The size and proportions of the various parts can be modified to suit the demands of the user.

Having now explained my construction, what I claim as my invention and desire to secure by Letters Patent is:—

1. In a spool holder, the combination of parallel plates, an upright rod upon which the plates are revoluble, slotted standards extending from one plate to the other, and spool clamps mounted in the slots in the standards.

2. In a spool holder, the combination of a base, an upright rod revolubly mounted thereon, perforated plates mounted on said rod near the ends of the same, and inclined slotted standards extending through said plates, spool-clamps mounted on the standards and comprising sides and backs, the backs having projections to enter the slots in the standards.

3. In a spool holder, the combination of a base, an upright rod, circular plates mounted on the rod and each provided with a circular row of perforations, the holes in the upper plate being a less distance from the rod than those in the lower, tubular rods extending through said holes and having longitudinal slots to receive spool-clamps, means to secure the upper ends of the standards, and spool-clamps, comprising sides and backs, mounted on the standards, the sides being formed with trunnions for the spools, the backs being formed with projections to enter the slots in the standards.

In testimony whereof I have signed this specification in the presence of two subscribing witnesses.

JOHN V. NEWTON.

Witnesses:
  HOMER D. MACDONALD,
  FLORA ULRICH.